B. S. AIKMAN.

PUMP AND PUMPING SYSTEM.

APPLICATION FILED DEC. 1, 1919.

Reissued Aug. 24, 1920.

14,935.

3 SHEETS—SHEET 1.

Inventor
Burton S. Aikman
By Brown Berthen & Denner
Attorneys

B. S. AIKMAN.

PUMP AND PUMPING SYSTEM.

APPLICATION FILED DEC. 1, 1919.

Reissued Aug. 24, 1920. 14,935.

3 SHEETS—SHEET 2.

Inventor
Burton S. Aikman
By Brown, Boettcher & Dienner
Attorneys

B. S. AIKMAN.

PUMP AND PUMPING SYSTEM.

APPLICATION FILED DEC. 1, 1919.

Reissued Aug. 24, 1920.

14,935.

3 SHEETS—SHEET 3.

Inventor
Burton S. Aikman
By Brown Boettcher & Dienner
Attorneys

UNITED STATES PATENT OFFICE

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

PUMP AND PUMPING SYSTEM.

14,935. Specification of Reissued Letters Patent. Reissued Aug. 24, 1920.

Original No. 1,253,559, dated January 15, 1918, Serial No. 52,808, filed September 27, 1915. Application for reissue filed December 1, 1919. Serial No. 341,306.

*To all whom it may concern:*

Be it known that I, BURTON S. AIKMAN, a citizen of the United States, residing at Milwaukee, in the county of Milwaukee and State of Wisconsin, have invented a certain new and useful Improvement in Pumps and Pumping Systems, of which the following is a full, clear, concise, and exact description, reference being had to the accompanying drawings, forming a part of this specification.

My invention relates to pumps and pumping systems and contemplates an improved apparatus which may be employed as an isolated plant for furnishing water to a residence or an industrial establishment from a nearby source, such as a well.

It is the purpose of my invention to provide an improved system which supplies water "fresh from the well," that is without the intervention of a storage or reserve tank, and which will be under "faucet control," by which I mean that the flow of water is controlled by the acts of opening and closing the faucets which form the supply outlets of the system.

To supply water fresh from the well and to maintain the flow of water under faucet control broadly is a matter of prior art. The apparatus and systems heretofore known and used were, however, subject to inherent difficulties, due to the fact that their mode of operation required complexities such as alternately operating chambers, valves operated by marginal differences in pressure or by time element devices, and to the fact that the pneumatic control employed led to frequent misoperations such as are commonly called "blow-overs" where the system becomes cleared of water and the compressed air, employed as an operating medium, is wasted.

Faucet control of water delivery in a system employing a single cylinder pump is shown for the first time in my co-pending application, Serial No. 50,941, filed September 16, 1915.

According to my invention, there is provided a single water chamber alternately subject to air pressure and relieved therefrom, the alternations being secured by the actuations of valve mechanisms which, in turn, are directly and mechanically dependent upon the rise and fall of the water in the chamber. It will be understood that the system is constantly under pressure and it is therefore a further object of my invention to provide an apparatus which will be as free from leaks as possible, which operates with a minimum consumption of air and which operates reliably and positively. The last mentioned characteristic is due to the direct relation of the valve mechanism to the water levels, whereby the movement of the valve is dependent upon the physical change which requires such movement, and I provide means for causing sudden actuations of the valve mechanism notwithstanding the fact that the rise and fall of the water in the chamber is comparatively gradual.

Faucet control of a water supply system presents certain problems not encountered in open pumping. The stream of water from the faucets must be steady. This was secured previously by two cylinders which operated alternately. In the present system I supply a single cylinder pump and an "air spring" or auxiliary pumping chamber to fill in the gap between the discharge strokes of the single pumping cylinder.

A further problem is a requirement the necessity for which does not arise in open pumping; namely that the valves of the pump be made so that they will prevent leakage either of air or of water. In the present case the main valves are all provided with yielding faces and seat in such a manner that the pressure which they are to retain tends to hold them tight upon their seats.

Another problem is the matter of throwing the air valve mechanism from an air admission to exhaust position or vice versa. In open pumping the rise and fall of water in the pump is quite rapid and no particular difficulty is encountered in shifting the air valves. In a faucet controlled system the flow of water may cease as by closing of the faucets just at the critical point in the operation of the pump where starting of the valve shifting motion has begun. Consequently unless some means is provided for making the shifting operation independent of the rate of water discharge the pump will center and the air will blow away leaving the system dead. Some means must be provided for starting the valve shifting operation at a predetermined stage of operations, such, for instance, as low level on discharge or high level on filling of the pump, and some means must be provided for insuring a complete operation or full stroke of the valve operating mechanism after the shifting operation is initiated.

A further requirement is a valve shifting means which shall invariably have sufficient power to operate the valve mechanism even on high air pressure. As previously explained, where the air valves are held to seat by pressure it is essential that the means for shifting the valves be invariably powerful enough to move the valves regardless of the pressure in the pump. This I accomplish by the use of a pressure motor operated by the same fluid pressure which tends to hold the valves to seat.

The conjoint use of the valves held to seat by pressure and the fluid pressure motor for pulling the valves from seat against pressure as herein disclosed, meets the requirements above outlined, namely tightness of the valves, full stroke and snap operation of the valves and means independent of the lift for invariably shifting the valves.

It is also desirable that no wastage of air occurs when the air valves are shifted. I accomplish this by making the operations of the air admission and exhaust valves overlap so that the exhaust valve is invariably closed before the admission valve is opened and the admission valve invariably closed before the exhaust valve is opened. This is a matter of prior art in open pumping but has not previously been employed in faucet controlled systems. It is of particular utility in the present construction in view of the fact that the valve operating motor receives fluid pressure independently of the pressure in the chamber so that even if the compressed air is shut off from the pumping chamber it does not affect the application of pressure to the motor.

My invention is illustrated in the accompanying drawings, in which.

Figure 1:
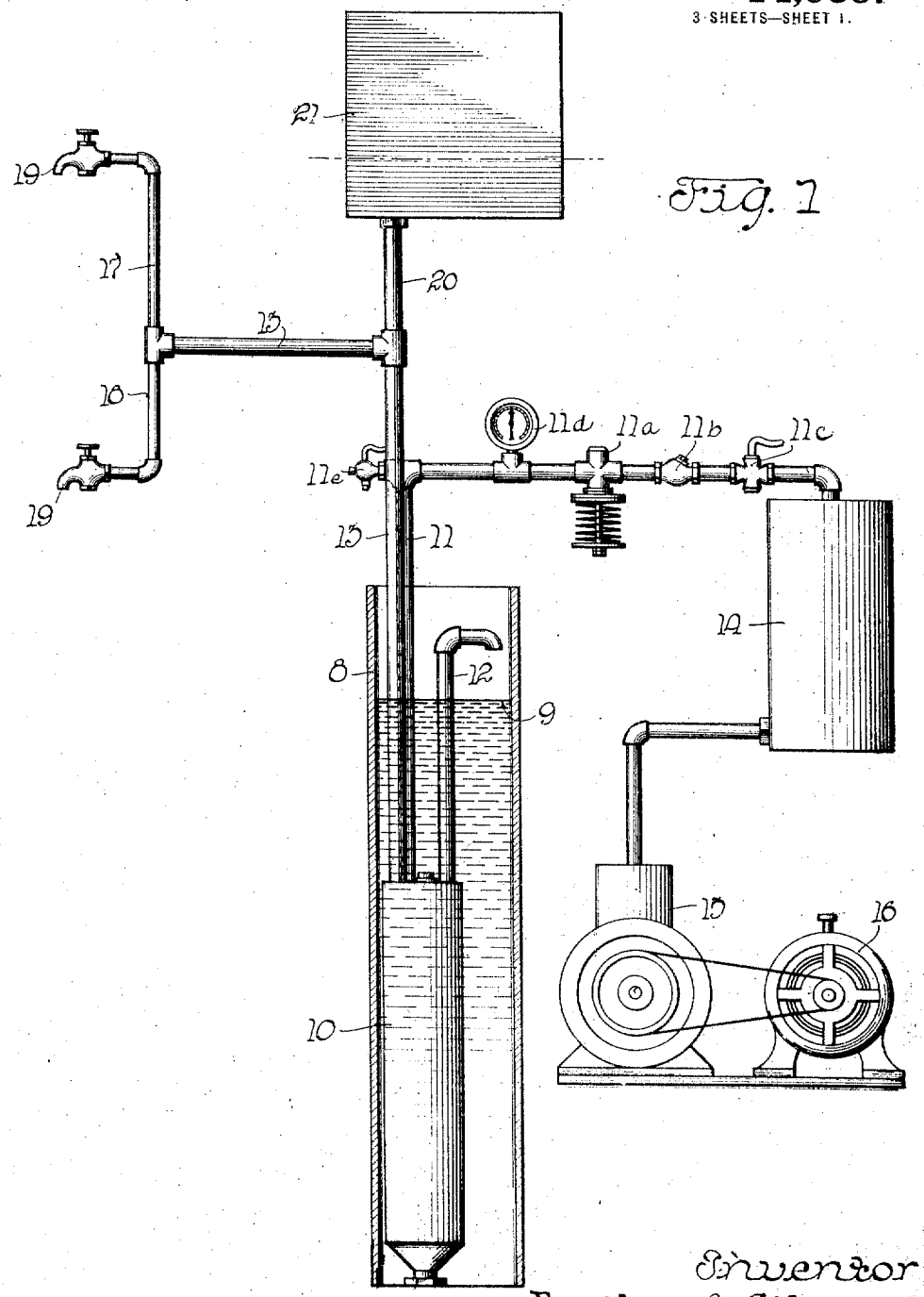
Figure 1 is a more or less diagrammatic view illustrating the system as a whole.
Figure 2:
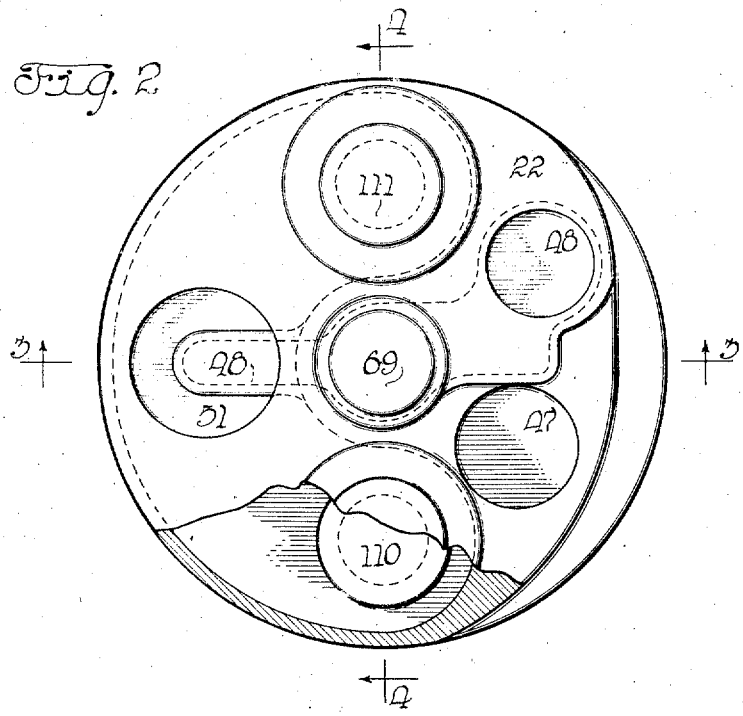
Fig. 2 is a plan view of the pump.
Figure 5:
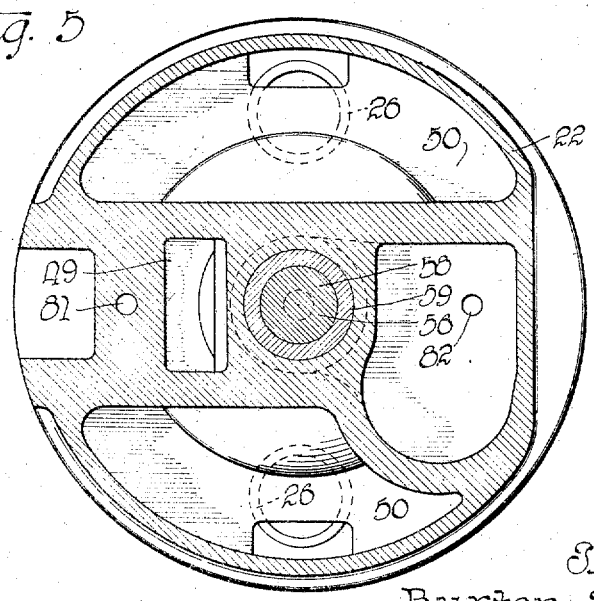
Fig. 5 is a sectional view taken on the plane of the line 5—5 of Fig. 3 and looking in the direction indicated by the arrows.

Referring first to Fig. 1, which, as before stated, is diagrammatic, it will be seen that the well curbing is illustrated at 8, the water level being indicated at 9. The pump structure, which I have indicated broadly by the reference character 10, is disposed in the well at a suitable distance below the water level therein, as will be described. The pump structure has leading therefrom three pipes, an air pressure pipe 11, an exhaust pipe 12, and a water discharge pipe 13. The air pressure pipe 11 is connected with a compressed air tank 14, in which air is compressed by means of a compressor 15, operated, for instance, by an electric motor 16. It will be clear to those skilled in the art that the compressor 15 may be operated by any suitable means, such as a gas engine or steam engine, and if desired means may be provided for automatically starting and stopping the prime mover dependent upon the fall and rise of pressure in the tank 14. In the pipe 11 the cut off valve $11^a$, air strainer $11^b$, reducing valve $11^c$, gage $11^d$, and drain cock $11^e$ are provided.

The water discharge pipe 13 leads to various branch pipes 17 and 18, each of which in turn, leads to an outlet faucet 19. By means of a pipe 20, the discharge pipe 13 is connected with a chamber 21, closed except for the entry pipe 20, for a purpose which will be pointed out presently.

It will now be understood that this system represents an isolated plant for installation in a residence, for instance. The water discharge pipe leads from the well, conveniently near by, to the distribution pipe in the building, and the compressor, motor, compressed air tank and chamber are suitably housed in any convenient way.

As before pointed out, pressure is constantly maintained upon the system. It is therefore necessary to maintain a certain pressure between predetermined minimum and maximum limits in the compressed air tank 14, this being done by the proper starting and stopping of the compressor 15, either manually or automatically. It has been my experience that a proper compressed air tank being provided, it is necessary, in employing a distribution system for an ordinary residence, for instance, merely to operate the compressor intermittently, say every two or three days, for a short time, in order to keep the pressure in the compressed air tank within the desired limit.

It will appear as this description proceeds that, with the pressure properly maintained upon the system, everything is at rest so long as all the outlet faucets of the system are closed, but as soon as one of them is opened the pumping mechanism will operate to maintain continuous the flow which immediately commences. When the faucet is again closed the apparatus comes to rest and it will appear that the feed has been direct from the well with the proper pressure to distribute it to whatever points desired.

Figure 3:
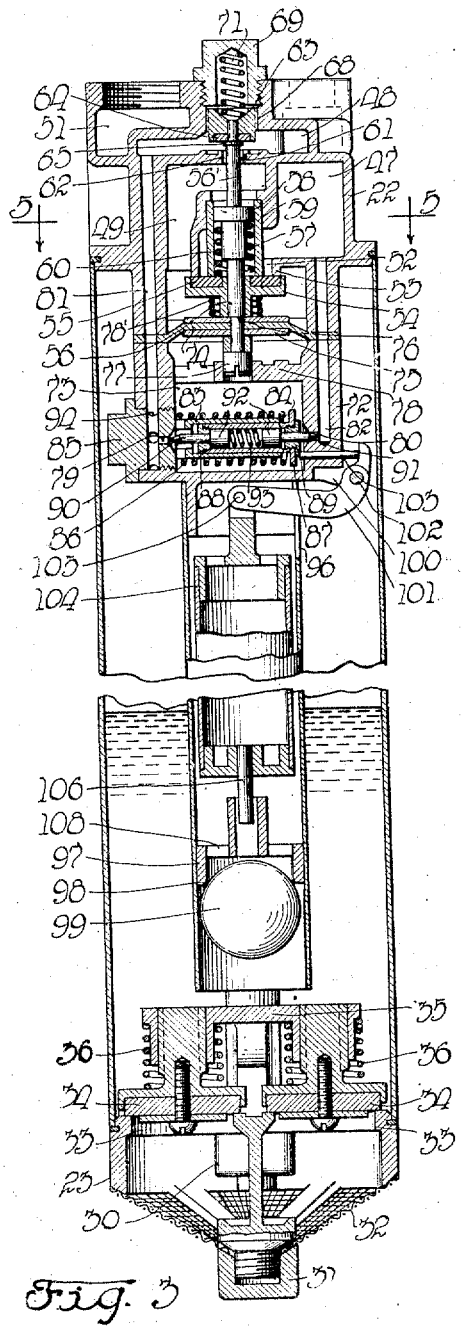
Fig. 3 is a vertical axial sectional view taken on the plane of the line 3—3 of Fig. 2 and looking in the direction indicated by the arrows.
Figure 4:
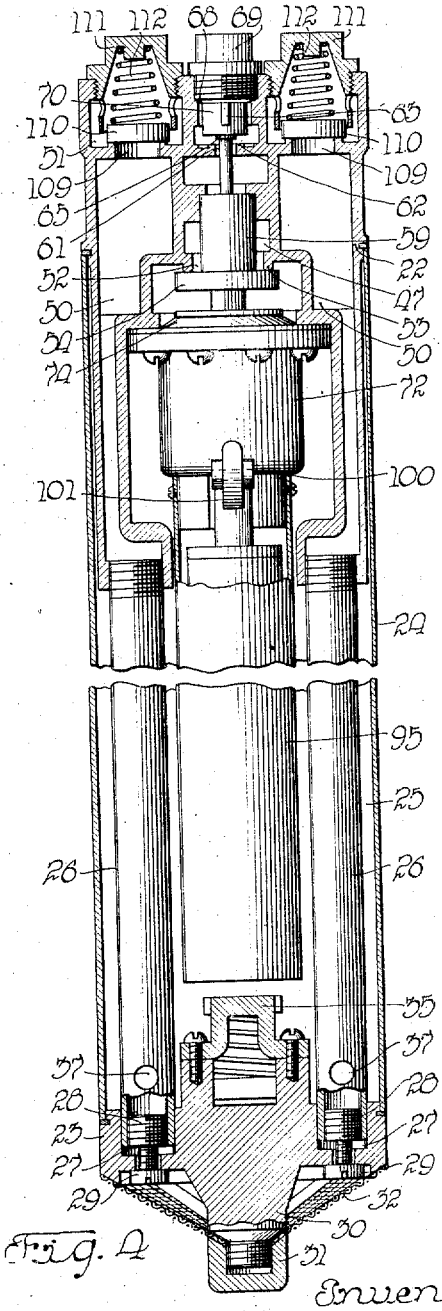
Fig. 4 is a vertical, axial sectional view taken on the plane of the line 4—4 of Fig. 2 and looking in the direction indicated by the arrows.

I refer now to Figs. 2 to 5, inclusive, to describe the pumping mechanism. A head member 22 and a base member 23, both of circular form, are joined by a cylindrical housing 24, which forms a water chamber 25. As illustrated in Fig. 4 the head member 22 and the base member 23 are tied together by means of two pipes 26—26 which thread into downward extensions from the head member 22 and which set in sockets 27—27 in the base member 23. Screw plugs 28—28 are inserted in the lower ends of the pipes 26—26, these screw plugs being adapted for the reception of cap screws 29—29, which, as shown, firmly hold the base member 23 in place and clamp the housing 24 between the base member and the head member to form a watertight and airtight compartment. The base member 23 is provided on its under side with a central extension 30, to which a nut 31 is screw threaded, a conical screen 32 being clamped between the nut 31 and the extension, as illustrated. The base member 23 is provided with two water inlet openings 33—33, each of which is controlled by a lift valve 34, mounted to reciprocate in a bracket 35 on the upper side of the base member 23, and provided with a spring 36, tending to hold it in closed position. The water which comes into the water chamber by way of the openings 33—33 is, as will be described later, forced from the chamber by way of the openings 37—37, in the lower ends of the pipes 26—26, the water passing upwardly through the pipes 26—26, as will be described.

The head member 22 is provided with the atmosphere or exhaust passageway 47, the compressed air inlet passageways 48 and 49, the primary water chambers 50—50, with which the pipes 26—26 are connected, and the secondary water chamber 51. These passageways and chambers are isolated from each other, as will be described, the atmosphere or exhaust passageway being connected with the pipe 12, the compressed air inlet passageway 48 being connected with the pipe 11, and the secondary water chamber 51, being connected with the discharge pipe 13.

Referring now to the exhaust passageway 47, it will be seen that it is so fashioned as to lead to the annular opening 52 in the head 22, a valve seat 53 surrounding this opening. A lift valve 54 having a compressible face 55 coöperates with the valve seat 53 to open and close the opening 52, the valve 54 being mounted upon the stem 56 of a pressure motor for vertical movement with a predetermined lost motion. The stem 56 is provided with a shoulder 57, to which I shall refer again later, and with an enlargement or guide block 58, which rides in a sleeve 59 set axially in the head 22 and disposed concentrically in the opening 52. A helical spring 60 is confined in the sleeve 59, between the enlargement 58 and the face of the valve 54.

The exhaust valve 54 is adapted to be held to its seat by pressure so that the valve will always tend to be tight. As the pump in use must stand for considerable periods of time under pressure it is essential to an operative system that this valve be tight to prevent the escape of the compressed air. If the air should leak out as when the pump stands under pressure over night the system would become inoperative from such leakage and would be out of order at a time when it is most needed.

The exhaust valve 54 is normally held between the two springs 60 and 78′ a short distance below the shoulder 57. The function of the spring 60 is to throw the exhaust valve 54 clear of the port after the shoulder 57 has cracked it from its seat. The function of the spring 78′ is to hold the exhaust valve 54 in an advanced position on the stem 56 so that on the upward stroke of the motor the exhaust valve 54 will be applied to its seat before the admission valve 63 is opened.

The two compressed air inlet passageways 48 and 49 are connected by a port 61, which has a valve seat 62 surrounding the upper end thereof, this valve seat coöperating with a valve 63 having a compressible face 64. The valve 63 has a stem 56′ which passes through the opening 61 and is arranged to be engaged by the enlargement 58. The valve 63 is guided in a pocket 68, axially in the top of the head 22, this pocket being closed by a plug 69. The valve 63 is provided with grooves 70 in order to balance the pressure on opposite sides of the valve when it is in open position, a spring 71 being disposed between the plug 69 and the valve and tending to move the valve downwardly.

The inlet valve 63 is also adapted to seat with the pressure of the compressed air holding it to seat so that during the interval between discharge strokes of the pump there will be no loss of air. The spring 71 will apply the inlet valve 63 to its seat and will hold the exhaust valve 54 off of seat so long as no pressure is on the pump so that even though the pump be subjected to rough usage in shipment the valves will be set in proper condition to permit filling of the pump when it is lowered into the well.

Secured to the under side of the head 22 is a diaphragm chamber structure 72 comprising a fluid pressure motor. This structure provides a diaphragm chamber 73, which is closed at the top by the diaphragm 74, the central part of this diaphragm being clamped between the two plates 75—75, which in turn are clamped between a shoulder 76 on the stem 56 by means of a clamping nut 77. This stem 56 extends down and is guided in a spider 78. A spring 78′ is disposed between the top plate 75 and the valve 54.

The diaphragm chamber 73 is provided with two ports, the compressed air port 79 and the exhaust port 80. The compressed air port 79 is connected with the compressed air passageway 48 by means of the passageway 81, cored in the diaphragm chamber casing 72 and in the head 22, and the exhaust port 80 is connected with the atmosphere or exhaust passageway 47 by means of the passageway 82, cored in the diaphragm chamber casing and the head 22, as clearly illustrated in Fig. 3.

The valve mechanism which controls the two ports 79 and 80 and which I term the pilot valve for the fluid pressure motor, will now be described: It will be seen that these two parts are coaxial and that they are transversely opposite each other. Concentric with the axis of these ports, a tube 83 is suitably mounted and this tube has telescoping therein another tube 84. The tube 83 is formed integral with a plug 85, screwed into the diaphragm chamber casing, and a spring 86 is disposed between a collar 87 on the inner tube 84 and the plug 85, this spring thus tending to move the inner tube out of the outer tube. The inner tube has its ends closed by means of the plugs 88 and 89, and each of these plugs carries a needle valve, the needle valve which controls the port 79 being indicated by the reference character 91. Each of the valves, within the tube 84, is provided with a head 92, which head limits the outward movement of the valve, a spring 93 being disposed between the two heads, as shown in Fig. 3. In order that the port 79 may communicate properly with the diaphragm chamber 73, the ports 94 are provided in the tube 83. There is thus lost motion between the valves 90 and 91 which permits the overlapping action hereafter to be described.

Supported from the under side of the diaphragm chamber structure 72 is a cylinder 95, closed except for the opening 96 at the top and the open bottom. Toward the lower end of the cylinder 95 it is internally provided with a ring 97, which provides a valve seat 98 adapted to be engaged by the ball float valve 99. A bracket 100 extends from the diaphragm chamber structure 72 and a bell crank lever 101 is pivoted thereto at 102. The upper arm of the bell crank lever contacts with a reciprocating pin 103 set in the casing of the diaphragm chamber and engaging the inner tube 84. The lower arm of the bell crank lever extends through the opening 96 into the cylinder 95, and a water weight or float 104 is hung from this arm of the bell crank lever at the pivot 105. The lower end of this water weight or float is provided with a stem 106 extending downwardly therefrom, this stem being guided in a sleeve 107 carried from the ring 97 by means of the spider 108.

The water chambers 50—50 are provided with the outlet passageways 109—109, each of which is controlled by a check valve 110, between which and a corresponding plug 111 a spring 112 is disposed. As will be described, the water is forced from the chambers 50—50 into the secondary water chamber 51, passing these valves, and from the secondary chamber 51 the water is forced on to the distribution system.

The operation of the device is as follows: Let it be assumed, by reference to Fig. 3, that the apparatus is now in such condition that water is being forced from the chamber 25. In this condition the water inlet valves 34 are closed and held to seat by pressure. The water discharge valves 110 are opened by the discharging water. The water weight 104 is in raised position and consequently the pilot valve closes the exhaust port 80 and opens the admission port 79 of the motor. The chamber has been partly emptied and the inner tube 84 of the pilot valve is in its right hand position. In this condition the compressed air transmitted down from the passageway 48 through the passageway 81, port 79 and ports 94 into the diaphragm chamber 73, and thus the diaphragm is held in its uppermost position. With the diaphragm in its upper position the exhaust valve 54 is seated upon the valve seat 53 to close off the water chamber from exhaust, and the valve 63 is lifted against the spring 71 from its seat 62 to admit compressed air down through the passageway 61, passageway 49 and into the water chamber. Thus, assuming that the water in the distribution system has an outlet, the compressed air forces the water out of the water chamber through the openings 37—37, in the pipes 26—26, then upwardly through the pipes 26—26, then through the primary water chambers 50—50, past the valves 110—110, and on to the system.

It will be understood, as this description goes on, that the valve 90 is held open and the valve 91 is held closed under the above conditions by the action of the spring 86, the float or water weight 104 being supported by the water within the cylinder 95 and thus exerting no influence to overcome the tension of this spring. However, as the water is forced from the chamber 25, the level is gradually lowered to a point where the float or water weight 104 comes down. This movement is transmitted by the mechanism which has been described to the tube 84 of the pilot valve mechanism to move it toward the left against the tension of the spring 88. This action first closes the port 79 and then opens the port 80, thus exhausting the pressure within the diaphragm chamber 73 to the atmosphere. With pressure above the diaphragm and atmosphere below it, an immediate reversal of the valves 54 and 63 results. In the downward movement of the diaphragm the stem 56 slides through the hub of the exhaust valve 54, permitting motion of the air admission valve independently of the exhaust valve whereby the valve 63 is first seated to cut off the compressed air from the water chamber, and thereafter the continued downward movement of the stem 56 takes up the lost motion between the motor stem 56 and the exhaust valve, which causes the shoulder 57 to engage the valve 54 to draw the valve away from its seat against the pressure of the compressed air in the pump chamber 25 to open the water chamber to the atmosphere, the valve 54 being then supported upon the spring 78'.

The spring 71 tends to hold the main valves in proper position for initiating the operation of the pump and the spring 86 holds the pilot valve in proper position to initiate the operation of the motor if water does fill the pump. This provides a unitary mechanism which is free from misoperation. When the pump is first lowered into the well the admission valve 63 is closed and the exhaust valve 54 is open so that water can flow into the pump and fill the chamber 25. At the same time the float or water weight 104 is in the down position until the pump is actually filled with water. Therefore until the water pours into the opening 96 the pilot valve of the motor holds the motor admission port 79 closed and the motor exhaust port 80 open preventing shifting of the main valves 63 and 54 until water has filled or substantially filled the pump chamber.

This is an important arrangement as it prevents blowing away any air when the pump is lowered into the well, and first started. It also prevents any wastage of air in case the water in the well fails or drops below a level sufficient to fill the pump. In the event that the water fails the pilot valve closes the motor admission port and the spring 71 closes the main admission valve and the pump F stops until the water supply comes back and then the pump starts again. Even if the water flows into the pump very slowly the pump will not run away but will pump only so fast as the water supply permits. Then refilling takes place. Under the head of the water in the well an immediate inrush of water from the well follows. The valves 34—34 open to permit this entry of water, and, as the water rises in the chamber 25, the float valve 99 is raised to its seat 98 to close off the cylinder 95 above that point. Thus, although the water rises farther in the water chamber 25, it does not rise within the cylinder 95 beyond the valve and there is no effect upon the water weight or float until the water in the chamber 25 has reached the plane of the bottom of the opening 96, after which it pours into the cylinder 95 quickly and raises the float or water weight to release the pressure against the spring 86. This allows the spring to act to close the port 80 and open the port 79. This action brings the pressure of the compressed air into the diaphragm chamber 73 and raises the diaphragm.

It is pertinent here to point out several important features in the action which have been described. With the entry of water into the water chamber from the well there is a comparatively gradual rise of the level in the water chamber, but there is no effect upon the float or water weight until that level has reached its maximum. Then, suddenly, after the desired level has been attained, the water weight is actuated. It will be seen also that the relation of the valves 90 and 91 is such that when the shift from one position to the other is made the compressed air port is closed before the atmosphere port is opened, and the atmosphere port is closed before the compressed air port is opened, thus avoiding any chance of a direct connection between the compressed air port and the atmosphere, even for an instant. The same feature lies in the relative action of the valves 54 and 63. Here, again, it will be noted that the arrangement is such that the valve 63 is closed before the valve 54 is opened, and the valve 54 is closed before the valve 63 is opened, air pressure maintaining the valve 54 closed immediately it is seated. When the reversal of the valves 54 and 63 takes place, as has just been described, the water chamber 25 is again closed off to the atmosphere and is made subject to the compressed air. Under these circumstances reference to Fig. 1 will show that water will also be forced into the air chamber 21, confining an air cushion above the water level formed therein, as indicated in dotted lines. It will be clear that if all the outlets of the distribution system are closed, everything will be at rest since, although there is pressure on top of the water in the chamber 25, there is no outlet for the water.

The speed with which the chamber 25 fills to the upper level of course depends upon the sizes of the inlet passageways and the head of the water in the well. I have made experiments which show that, with a structure built substantially along the lines of that illustrated in the drawings, and substantially those proportions, submerged about ten feet below the level of the water in the well, a period of about 1.5 seconds is required for the filling operation. If the capacity of the discharge and distribution pipes is great enough, this momentary cessation of pressure will be hardly perceptible at the faucets, particularly since the expulsion period, assuming one or more faucets to be open for a considerable length of time, consumes practically all the time. However, in order that the gap in the flow may be properly filled in, I provide the air chamber 21 to which the pipe 20 delivers from the discharge pipe 13. Obviously, when the water in the discharge pipe 13 is under pressure, as it is practically all of the time, a certain amount of water is forced up into the chamber 21. This action compresses the air in the chamber and forms a cushion which is maintained so long as the pressure is not relieved. As soon as the pressure is relieved, however, by the cessation of the pressure in the pump, with a faucet open, the air is given opportunity to expand and in doing so forces out the water which has become trapped therein and provides a flow from the faucet during the refilling period of the pump. This chamber 21 will, of course, be distinguished from a storage tank, since all it does is to increase the capacity of the system and provide means for a certain amount of compression to be released for a very short period, about 1.5 seconds, at a time. It will be understood that this water which is in the chamber 21 is directly a part of the discharge system, being located in effect directly between the well and the faucet, and is constantly being changed and in this way a continuous flow from the faucet is insured. I have found by experiment that the air in the chamber 21 is kept properly replenished by bubbles of air which follow the expulsion of water from the water chamber 25 of the pump structure and that it is automatically relieved from an excess of air by the opening of a faucet, this latter action being instantaneous and imperceptible to the opening of the faucet.

It will be seen that the upper and lower levels of the water in the chamber 25 positively determine the reversal of the valves. The atmosphere condition is maintained until the upper level reaches the bottom of the opening 96 and the compressed air condition is maintained until the level has dropped to the point of dropping the water weight. In this way the reversal of the valves is mechanically dependent upon the conditions which require their reversal, and there is thus secured a positive and reliable operation not subject to the defects pointed out in the early part of this description.

It will be seen that the reversal of the valves is sudden, as has been described, and that the arrangement is such that at no time is there even a momentary connection between the compressed air and the atmosphere. It will be clear that suction instead of full atmosphere may be applied to the pipe 12 without departing from the spirit and scope of my invention.

I have endeavored to embody the features of my invention in a simple structure involving a minimum number of parts of simple design, and some of the more limited of the appended claims are directed to these more specific features.

I claim:

1. In a pump, a liquid chamber having inlet and outlet means, an exhaust passageway, a pressure medium passageway, a pressure motor, a valve mechanism operated by said pressure motor to control the connection of said chamber with said passageways, means controlling the connection of pressure to and exhaust from said pressure motor, a water chamber having an inlet at the top and an outlet at the bottom, and a level controlled device in said water chamber mechanically connected with said controlling means.

2. In a pump, a liquid chamber having inlet and outlet means, an exhaust passageway, a pressure medium passageway, a pressure motor, valve mechanism operated by said pressure motor to control the connection of said chamber with said passageways, means controlling the connection of pressure to and exhaust from said pressure motor, a water chamber within said liquid chamber having an inlet at the top and an outlet at the bottom, and a level controlled device in said water chamber mechanically connected with said controlling means.

3. In a pump, a liquid chamber having inlet and outlet openings, an exhaust passageway, a pressure medium passageway, pressure means having one side arranged to be exposed to the pressure medium and its other side exposed to a motor chamber having two ports, one port an exhaust port and the other a pressure medium port, valves operated by said pressure means for closing said pressure medium port of said liquid chamber and opening said exhaust port of said liquid chamber, and vice versa, and valves for closing said pressure medium port of said motor chamber and opening said exhaust port of said motor chamber, and vice versa, and means for operating said last named valves.

4. In a pump, a liquid chamber having inlet and outlet openings, an exhaust passageway, a pressure medium passageway, pressure means having one side arranged to be exposed to the pressure medium and its other side exposed to a chamber having two ports, one port an exhaust port and the other a pressure medium port, valves operated by said pressure means for closing said pressure medium port of said liquid chamber, and opening said exhaust port of said liquid chamber, and vice versa, and valves for closing said pressure medium port of said motor chamber and opening said exhaust port of said motor chamber, and vice versa, and float means for operating said last named valves.

5. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port of said water chamber and opening said exhaust port of said water chamber, and vice versa, and valves for closing said compressed air port of said motor chamber and then opening said exhaust port of said motor chamber, and vice versa, and means for operating said last named valves.

6. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber and vice versa, and valves for closing said compressed air port and opening said exhaust port of said motor chamber and vice versa, a float for operating said last named valves, and a float chamber for said float in said water chamber, the water entering said float chamber from the top and leaving it from the bottom.

7. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber, and vice versa, and valves for closing said compressed air port and opening said exhaust port of said motor chamber and vice versa, a float for operating said last named valves and a float chamber for said float in said water chamber, said float chamber having an inlet at the top and an outlet at the bottom.

8. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber, and vice versa, and valves for closing said compressed air port and opening said exhaust port of said motor chamber and vice versa, a float for operating said last named valves, and a float chamber for said float in said water chamber, said float chamber having an inlet at the top and an outlet at the bottom, and a valve controlling said outlet.

9. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber, and vice versa, and valves for closing said compressed air port and opening said exhaust port of said motor chamber, and vice versa, a float for operating said last named valves, and a float chamber for said float in said water chamber, said float chamber having an inlet at the top and an outlet at the bottom and a float valve controlling said outlet.

10. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber, and vice versa, and valves for closing said compressed air port and opening said exhaust port of said motor chamber, and vice versa, a float for operating said last named valves, and a float chamber for said float in said water chamber, said float chamber having an inlet at the top and an outlet at the bottom and a float valve controlling said outlet, said last named valves tending to open the compressed air port and close the atmosphere port and being reversed by the dropping of the float.

11. In a pump, a water chamber having inlet and outlet openings, an exhaust port for said chamber, a compressed air port for said chamber, pressure means having one side exposed to the interior of said water chamber and its other side exposed to a motor chamber having two ports, one port an exhaust port and the other a compressed air port, valves operated by said pressure means for closing said compressed air port and opening said exhaust port of said water chamber, and vice versa, and valves for closing said compressed air port and opening said exhaust port of said motor chamber, and vice versa, and means for operating said last named valves, said pressure means operating to close the first named exhaust port and open the first named compressed air port when the last named chamber is exposed to compressed air, and to reverse the action when said last named chamber is exposed to the exhaust.

12. In combination, a single cylinder pump, a source of compressed air, an air spring connected to the pump and a closed faucet controlled delivery system connected to the pump and tank, said pump comprising valves for liquid, a main air valve mechanism, a pressure motor operated in one direction by compressed air independently of the main air valve mechanism, means controlled by low level of the liquid in the pump to cause the motor to shift the main air valve to exhaust position and means controlled by high level condition of liquid in the pump to cause the motor to shift the main air valve to close the exhaust.

13. In combination, a single cylinder pump, a source of compressed air, an air spring connected to the pump and a closed faucet controlled delivery system connected to the pump and air spring, said pump comprising valves for liquid, a main air valve mechanism, a pressure motor operated in one direction by compressed air independent of the main air valve mechanism, means controlled by low level of liquid in the pump to cause the motor to shift the main air valve to cut off further admission of compressed air and means controlled by high level of liquid in the pump to cause the motor to shift the valve to re-admit compressed air.

14. In combination, a pump chamber having liquid inlet and discharge valves, a source of compressed air, an admission valve of the puppet type adapted to be held against its seat by the pressure of the compressed air, guiding means for said valve, a separate stem for said valve, a fluid pressure motor for opening the admission valve against the pressure of the compressed air, said motor having a flexible diaphragm, a separate motor stem, means for guiding the motor stem into contact with said valve stem and level controlled means responsive to filling of the pump chamber with liquid for admitting pressure to the pressure motor.

15. In combination, a pump chamber having valves for liquid, a source of motive fluid, an admission valve, spring means tending to close said valve, a pressure motor in the pump chamber, a lost motion connection between said motor and said valve for opening the valve, a fluid pressure passageway for the motor, independent of the said admission valve, and a high level controlled valve for admitting pressure from said passageway to the motor to open the admission valve.

16. In combination, a pumping chamber having valves for liquid, a source of motive fluid, an admission valve, a separate exhaust valve, a pressure motor having a lost motion connection with both valves, and movable motor elements actuated by fluid pressure alternately in opposite directions, and level controlled means governing the application of fluid pressure to the motor.

17. In combination, a pumping chamber having valves for liquid, a source of motive fluid, an admission valve, a separate exhaust valve, a pressure motor having a lost motion connection with said valves whereby the admission valve is closed before the exhaust valve is opened, and whereby the exhaust valve is closed before the admission valve is opened, and level controlled means governing the application of pressure to said motor to operate the valves in accordance with level conditions.

18. In combination, a pump chamber having valves for liquid, air admission and exhaust valves adapted to be held to their seats by pressure of the motive fluid, and a pressure motor having an element movable alternately in opposite directions by fluid pressure for opening said valves alternately.

19. In combination, a pump chamber having valves for liquid, air admission and exhaust valves adapted to be held to their seats by pressure of the motive fluid, and a pressure motor having an element movable alternately in opposite directions by fluid pressure for opening said valves alternately, and a lost motion connection between the movable element and said valves for applying the exhaust valve to seat before the admission valve opens and for applying the admission valve to seat before the exhaust valve opens.

20. In combination, a pump chamber having valves for liquid, a source of compressed air, an exhaust valve adapted to be applied to its seat when water has filled the pump chamber and to be held to its seat by pressure, a pressure motor having a pressure element subject on one side to the pressure within the pump chamber and on the other side to pressure fluid directly from said source, and level controlled means governing the application and exhaust of pressure fluid to and from said other side of the motor element.

21. In combination, a pump chamber having valves for liquid, a source of motive fluid, a main valve for the pumping chamber, a pressure motor for operating the main valve, said motor having a movable member adapted to be exposed to pressure on each side, a pilot valve for governing the application and exhaust of pressure on one side of the motor member, level controlled means governing said pilot valve, said main valve governing the application of pressure and exhaust pressure on the other side of said motor member.

22. In a pump, a main admission valve, a main exhaust valve, a pressure motor having a movable member for operating the main valve, a pilot admission valve and a pilot exhaust valve for the motor, the main valve governing the pressure on one side of the motor and the pilot valve governing the pressure on the other side of the member.

23. In a pump, a main admission valve, a main exhaust valve, a pressure motor having a movable member for operating the main valve, a pilot admission valve and a pilot exhaust valve for the motor, the main valve governing the pressure on one side of the motor, the pilot valve governing the pressure on the other side of the member, and level controlled means governing the pilot valve.

24. In a pump, a main exhaust valve, a main admission valve, a motor having a movable member, a pilot valve governing the admission of motive fluid to and exhaust from one side of the member, said main exhaust and admission valves being operated by said motor to admit and exhaust pressure to and from the other side of said motor member and level controlled means governing the operation of said pilot valve.

25. In a pump, a main admission valve, a motor having a movable member, a pilot valve governing the admission of motive fluid to one side of the motor member to cause the main admission valve to open and admit pressure to the other side of said member, a main exhaust valve, a pilot exhaust valve for the motor governing the exhaust of pressure on said one side of the motor to cause the motor to open the main exhaust valve and exhaust pressure on the other side of the motor member, and level controlled means governing the operation of said pilot valves.

26. In a pump, a movable motor member having a stem, a main admission valve lying in the path of outward movement of the stem to open the admission valve, a main exhaust valve loosely mounted on the stem and held between two springs, said stem having a projection or shoulder adapted on inward movement to engage the exhaust valve.

27. In a pump, a movable motor member having a stem, a main admission valve lying in the path of outward movement of the stem to open the admission valve, a main exhaust valve loosely mounted on the stem and held between two springs, said stem having a projection or shoulder adapted on inward movement to engage the exhaust valve, said main valves being of the puppet type and both seating with pressure.

28. In a pump, a movable pressure operated motor member having a valve actuating device, a main admission valve lying in the path of movement of the device to be opened by outward movement of the device, a main exhaust valve having a lost motion connection with the device comprising a spring on one side of the exhaust valve and a shoulder connected with the device on the other for positively moving the exhaust valve to open position.

29. In a pump, a movable pressure operated motor member having a valve actuating device, a main admission valve lying in the path of movement of the device to be opened by outward movement of the device, a main exhaust valve having a lost motion connection with the device comprising a spring on one side of the exhaust valve and a shoulder connected with the device on the other for positively moving the exhaust valve to open position, said main valves being of the puppet type and both seating with pressure.

30. In a pump, a movable pressure operated motor member having a valve actuating device, a main admission valve lying in the path of outward movement of the device to be opened by the device, a main exhaust valve having a lost motion connection with the device comprising a spring on each side of the exhaust valve and a shoulder connected to the device for positively moving the exhaust valve after the corresponding spring has been compressed.

31. In a pump, a main valve mechanism, a pressure motor for operating the valve mechanism, high level controlled means governing the application of pressure to the motor to move the main valve mechanism to admission position, and spring means adapted when no pressure is on the pump to move the main valve mechanism to exhaust position.

32. In a pump, a main valve mechanism, a pressure motor for operating the valve mechanism, high level controlled means governing the application of pressure to the motor to move the main valve mechanism to admission position, and spring means adapted when no pressure is on the pump to move the main valve mechanism to exhaust position, said high level means preventing the application of pressure to the motor and opening the exhaust valve of the motor when the water fails to fill the pump.

33. In a pump, a pumping chamber having valves for liquid and valves for the admission and exhaust of compressed air to and from the pumping chamber, a float controlling the operation of said valves, a water box inclosing said floats, said water box being open at the top and having a check valve at the bottom opening downwardly only.

34. In a pump, a pump chamber having valves for liquid, a main air valve mechanism for the admission and exhaust of compressed air to and from the chamber, a motor for operating said main valve mechanism, a pilot valve governing the operation of the motor, a float controlling said pilot valve and a water box inclosing said float, said water box having an opening at the top for the admission of water and an outlet at the bottom for the discharge of water from the box.

35. In a pneumatic pump, a controlling float for high and low level, a water box surrounding said float, said water box having an opening at the top for the admission of water and a check valved outlet at the bottom for the discharge of water.

36. In a pneumatic pump, a member for high and low level control of the valve mechanism of the pump comprising an elongated body having a lever connected at its upper end, a water box surrounding said body, said box having a guiding member in the lower end for the body, said box having an admission opening at the top and a discharge outlet at the bottom, said discharge outlet being controlled by a check valve.

37. In a pneumatic pump, main air valve mechanism for admitting compressed air to and exhausting the same from the pump, a pressure motor for operating said valve mechanism, said pressure motor having an admission passageway and an exhaust passageway, pilot valve members for said passageways, said pilot valve members being connected together by a lost motion connection comprising a spring tending to hold the pilot valve members in position to close said passageways, a hollow sleeve inclosing said springs and parts of the valves, and a float for moving said sleeve.

38. In a pump, a main valve operating motor comprising a movable member and a pressure chamber, passageways for admission and exhaust of motive fluid to said chamber said passageways having ports lying in line opposite each other, a pilot valve member having two separate valve plugs coöperating with said ports, spring means tending to force both of the plugs into the ports to close off both ports simultaneously, a cage for said plugs and said spring, and a float for shifting said cage.

39. In a pneumatic pump, a main valve shifting motor comprising a movable member and a motor chamber, passageways for admission and exhaust of motive fluid to and from said motor chamber, said passageways having ports controlling the admission and exhaust of motive fluid, said ports lying axially in line with each other, a valve member for each port, said valve members being connected together by a lost motion connection permitting the application of said valves yieldingly to the port and level controlled means for shifting said valves to govern operation of the motor.

40. In a pneumatic pump, a main valve shifting motor comprising a movable member and a motor chamber, admission and exhaust passageways for said chamber for controlling the operation of the motor, said passageways having ports, a valve plug for each port, a common member having lost motion connection with each valve plug and level controlled means for shifting said common member.

41. In combination, a pneumatic pump having a pumping chamber, water inlet and discharge valves, main air valve mechanism, a fluid pressure motor comprising a movable member and a motor chamber having an admission passageway and an exhaust passageway, level controlled valve means governing said admission and exhaust passageways of the motor, said motor member being adapted to be moved alternately in opposite directions by fluid pressure.

42. In combination, a pump chamber having valves for liquid, a source of motive fluid, a main admission valve of the puppet type adapted to be held to seat by the pressure of the motive fluid, a fluid pressure motor controlled by high level for opening the admission valve against pressure, an exhaust valve also operated by said motor, said motor having a lost motion connection with said admission valve to permit the admission valve to be closed before the exhaust valve is opened.

In witness whereof I hereunto subscribe my name this 10th day of November, 1919.

BURTON S. AIKMAN